J. SHACKLETON.
Steam Heater.
No. 3,845.
Reissued Feb. 15, 1870.
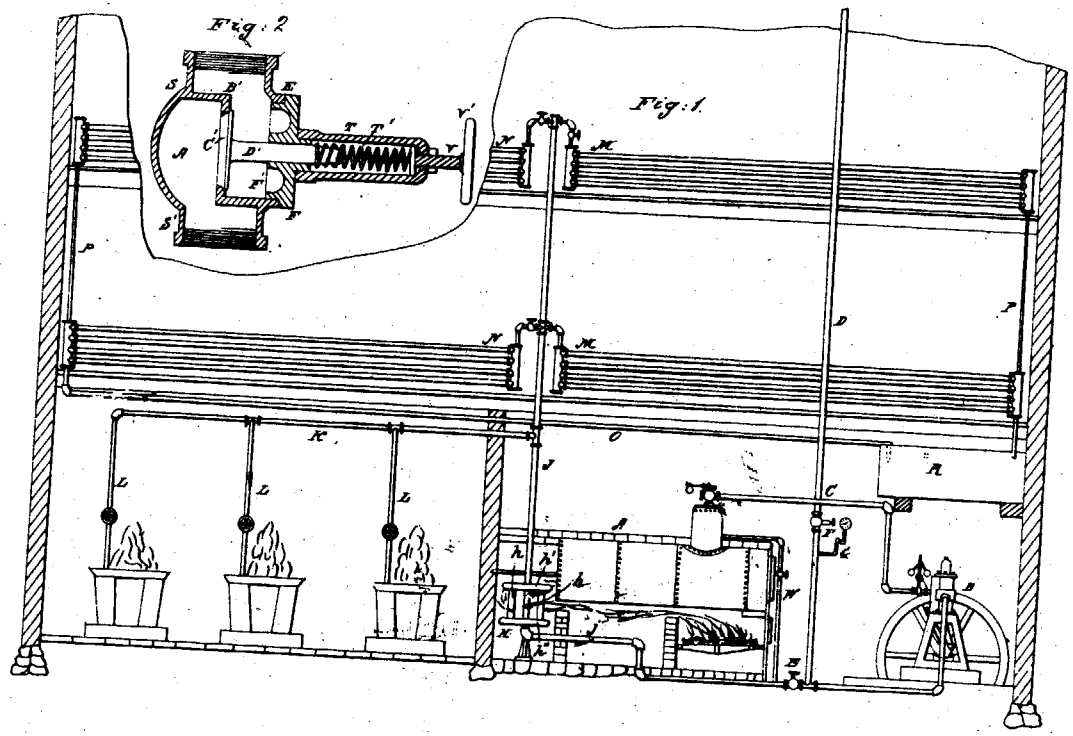
Witnesses:
W. S. Humphrey.
J. H. Burridge.
Inventor:
J. Shackleton.

United States Patent Office.

JOSEPH SHACKLETON, OF RAHWAY, NEW JERSEY.

*Letters Patent No.* 87,301, *dated February* 23, 1869; *reissue No.* 3,845, *dated February* 15, 1870.

DIVISION No. 3.

STEAM-HEATER

The Schedule referred to in these Letters Patent and making part of the same.

I, JOSEPH SHACKLETON, of Rahway, Union county, State of New Jersey, have invented a new and useful Mode of Utilizing the Exhaust Steam of Engines to Heat Buildings, and for heating dyers' kettles, soap-boilers, and the various purposes wherein live steam is now employed; and I do hereby declare that the following is a full, clear, and exact description of the mode or system employed, reference being had to the annexed drawings making part of this specification.

Figure 1 represents a cross-section of the building, with the location of the boiler A, engine B, steam-pipe C, exhaust D, by-pass W, superheater H, heating pipe J, and heating series M M N N, also boiler-heating pipe K and L L L.

P P are condensing pipes.

O is the return condensing pipe leading to the tank or boiler-feeder R.

G is a back-pressure gauge.

Figure 2 represents the automatic or self-acting exhaust-valve, which is placed on the exhaust-pipe at F.

The operation of this system of heating by exhaust steam consists in conducting the steam after it has actuated the engine into the reheater or superheater H, where it gains a greatly increased temperature.

It is then passed through pipe J into the series of heaters M M N N K L L L, where it radiates its surplus heat to warm buildings, or to heat dyers' kettles, and the various heating purposes for which steam is ordinarily employed.

The superheater H consists of a series of pipes *h*, connecting at their ends with and opening into the chambered heads *h'* *h''*, so arranged as to allow the steam to pass from the exhaust-pipe *j*, through the head *h''*, pipes *h*, head *h'*, into the pipe J, thus exposing the steam to a large amount of fire-surface, which rapidly elevates its temperature.

After the steam has made its circuit in the series of heating pipes M M N N, &c., it becomes condensed and flows back through pipes P P and O into tank or feeder R in the form of pure distilled water of a high temperature, which is again returned to the boiler, thereby saving fuel and preventing incrustation in the boiler.

It will be observed that the exhaust steam is reheated by the waste heat of the furnace that heats the boiler, at little or no extra expense for fuel.

When the engine B is not at work, valve E is closed, and steam is taken directly from the boiler A through the by-pass pipe W, and passes through the reheater in the usual manner to supply the heating system.

The automatic valve F referred to consists of a shell, A', fig. 2, the same being provided with an induction and eduction boss opening S S', the inside of which is threaded to admit of its attachment to the exhaust-pipe.

Within said shell is a valve-seat, B', to which is fitted the valve C', attached to one end of the guide-stem D', projected through a screw-cap, E', secured in the opening F' of the shell A'.

T is a tube, one end of which is screwed to the boss of the cap E'.

In said tube is a spring, T', the position of which in its relation to the valve-stem is such that it is in contact therewith, and by it exerts its resistancy upon the valve, thereby keeping it closed.

The tension of the spring is graduated by the adjusting screw V, projected through the outer end of the tube and manipulated by the hand-wheel V'.

The practical operation of this valve is as follows, viz:

By means of the threaded boss openings referred to it is secured to the exhaust pipe of the engine, the steam being admitted to the shell through the opening S', passing thence through the valve, and from which it escapes through the opening S into the continuation of the exhaust-pipes.

The tension of the spring giving resistance to the valve is graduated by the adjusting screw V, as may be required in order to acccomodate the valve to a variable pressure of steam.

This facility of accommodating the valve to the variable pressure of steam in the manner described renders the valve applicable to engines of different capacities, and also enables the operator to correct any weakness of the spring which may result from its wearing.

What I claim, and desire to secure by Letters Patent of the United States, is—

The combination of an automatic compensating valve with an apparatus for reheating and heating, as and for the purpose substantially as described.

JOSEPH SHACKLETON.

Witnesses:

NATHANIEL GILL,
WM. H. CLARKSON.